May 31, 1960  C. R. BELL  2,939,123
MONITORING SYSTEM
Filed Feb. 2, 1956
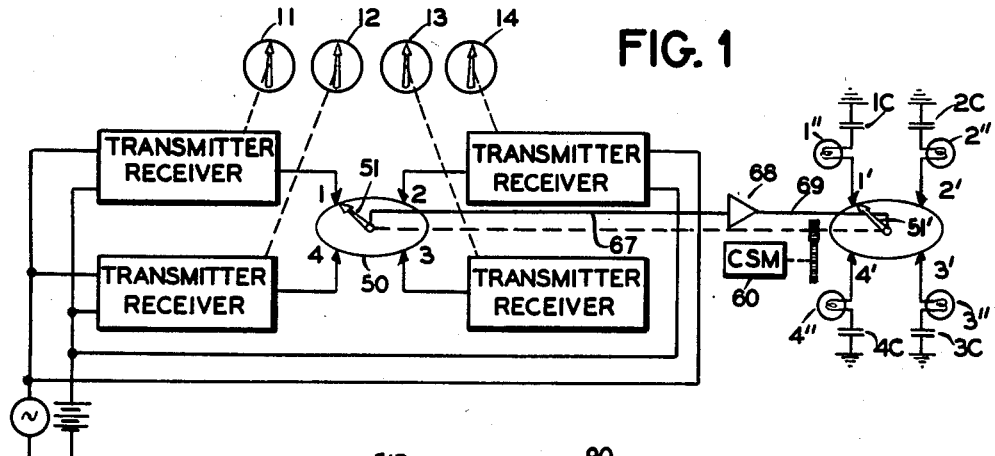
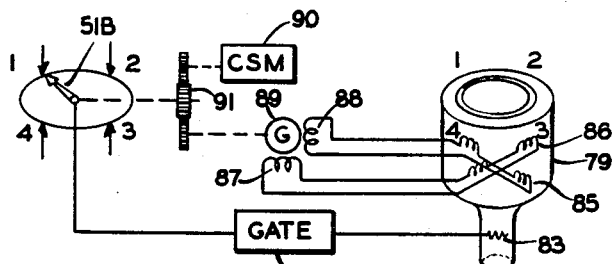
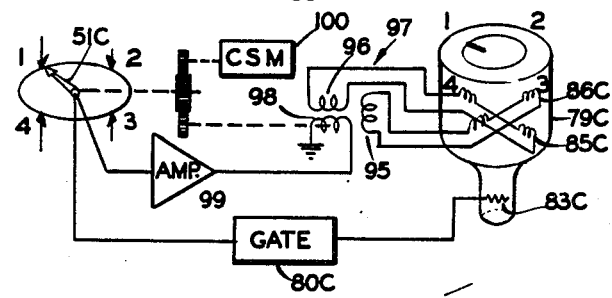
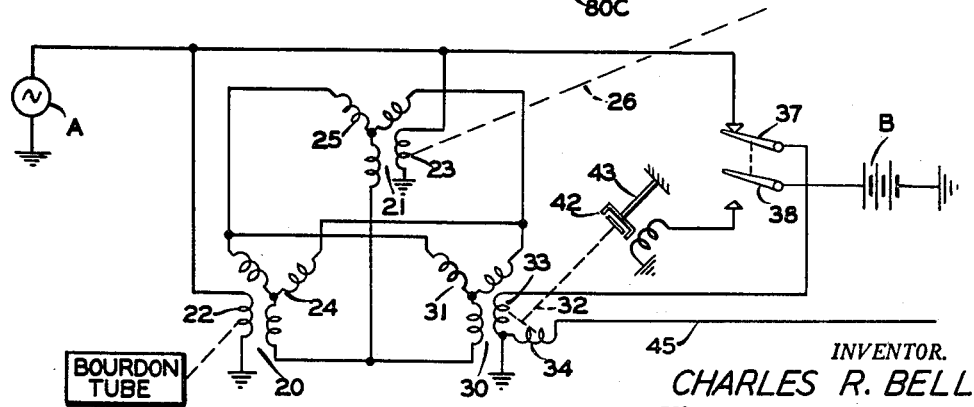
INVENTOR.
CHARLES R. BELL
BY
Oscar B Brumback
ATTORNEY

United States Patent Office 2,939,123
Patented May 31, 1960

2,939,123

MONITORING SYSTEM

Charles R. Bell, Hillsdale, N.J., assignor to Bendix Aviation Corporation, Teterboro, N.J., a corporation of Delaware Filed Feb. 2, 1956, Ser. No. 562,964

13 Claims. (Cl. 340—213)

This invention relates generally to indicators for control systems and more particularly to a means for monitoring the instruments of a control system.

The control panel of a modern aircraft is crowded with indicators showing such vital operating conditions as manifold pressure, fuel pressure, oil and hydraulic pressure, oil temperature, engine r.p.m., etc. Generally, the indications of these instruments show the units are operating properly for the instantaneous condition of the craft. However, the human pilot must constantly scan these instruments to see if any change occurred in the operating condition of the various units. In addition to the burden of determining and acting on the control and operational data of these instruments, the pilot must also continuously survey the condition of the craft with respect to external situations.

An object of the present invention, therefore, is to provide a novel monitor for lightening the tasks of an operator by indicating which of a number of conditions has departed in value from a normal value.

A further object of the invention is to provide a novel transmitter-receiver device wherein the receiver is synchronized with the transmitter until a desired value of a condition is reached, and thereafter the receiver provides a signal corresponding to the deviation from this value.

The foregoing and other objects and advantages of the invention will appear more fully hereinafter from a consideration of the detailed description which follows, taken together with the accompanying drawing wherein three embodiments of the invention are illustrated. It is to be expressly understood, however, that the drawing is for the purposes of illustration and description, and is not to be construed as defining the limits of the invention.

In the single sheet of drawing wherein like parts are marked alike:

Figure 1 illustrates schematically an embodiment of the invention for monitoring four oil pressure indicators;

Figure 2 illustrates schematically a transmitter receiver arrangement shown in block form in Figure 1;

Figure 3 illustrates schematically another embodiment of the invention; and

Figure 4 illustrates schematically a still further embodiment of the invention.

For purposes of description, the novel monitoring arrangement is illustrated in Figure 1 as being incorporated in the control system of an aircraft having four engines; instruments 11, 12, 13 and 14 showing the oil pressures of each engine. The operation of conventional aircraft as heretofore known would require the pilot, in addition to his other duties, to periodically scan or check these indicators 11, 12, 13 and 14 to determine whether the pressures had changed. In accordance with the present invention, the conditions shown by these instruments are scanned automatically and any instrument registering a change is indicated to the pilot.

The sensing and transmission arrangements for each instrument may be identical. Thus, these arrangements are shown in block form in Figure 1 and one is shown in detail in Figure 2. Turning to Figure 2, inductive devices 20 and 21 constitute a well known transmitter-receiver arrangement having rotors 22, 23 and stators 24, 25. Rotors 22 and 23 are energized from a suitable source of alternating current A and stators 24 and 25 are connected in parallel. Rotor 22 is displaceable relative to stator 24 by a suitable actuating mechanism which in the instant example may be a conventional Bourdon tube connected with the oil line of the engine. By a suitable mechanical connection 26, rotor 23 of the receiver is connected with the pointer of an indicator 11, 12, 13 or 14 so that movement of the rotor causes the pointer to rotate and indicate on the dial the oil pressure value received from the transmitter.

The transformer action existing between the energized single phase wound two pole rotor 22 and the three phase Y-connected wound stator 24 of the transmitter inductive device 20 induces in the stator windings 24 three voltages varying sinusoidally with the angular position of rotor 22; a definite combination of these voltages existing for any position of rotor 22. When rotors 22 and 23 are not in the same position relative to their stators 24 and 25, the voltage combination in one stator will differ from that in the other stator; current will flow through the stator connections and stator windings; and receiver rotor 23 will rotate since it is not held in position as is rotor 22. As receiver rotor 23 approaches the same relative position in stator 25 that rotor 22 occupies in stator 24, the difference between the stator voltages diminishes, becoming zero when both rotors occupy the same relative position. At this time, the combination of voltages in the stators 24 and 25 are equal and the windings of rotors 22 and 23 are parallel to the resultant of the voltages in the stator windings. Thus, the position of rotor 23 of inductive device 21 shows the condition existing at the transmitter 20 and reflected by the position of rotor 22.

Several receivers may be connected to one transmitter and the position of the rotor of each receiver will accurately reflect the position of the rotor of the transmitter. In accordance with the present invention, a second receiver inductive device 30 has its stator 31 connected in parallel with the transmitter stator 24. The rotor shaft 32 of inductive device 30, however, carries two rotor windings 33 and 34 wound at right angles to each other. Thus, when one winding 33 is parallel with the resultant voltage field of the stator, the other winding 34 is perpendicular to the resultant voltage. As long as rotor winding 33 is energized, rotor winding 33 will be maintained in positional agreement with rotor winding 22 and parallel with the resultant field of stator 31; and rotor winding 34 will be maintained perpendicular to the resultant field and will develop no output.

The rotor winding 33 is energized from an alternating current source A when switch arm 37 is in the closed position shown. Suitably attached to switch arm 37 is another switch arm 38 which is connected to a suitable direct current excitation source B and which is in an open position when switch 38 is in a closed position. Moving switch arm 37 to an open position deenergizes rotor 33 so that it can no longer follow the movement of the rotor 22, and the attendant closing of switch 38 energizes a magnetic clutch 42, thereby engaging shaft 32 with a fixed shaft 43 to hold rotor 33 and shaft 32 in the last position of the rotor. Thereafter, any displacement of rotor 22 relative to stator 24 changes the position of the resultant field in stator 31 relative to stator 34 and develops a signal at this rotor corresponding in phase and amplitude to the direction and extent of displacement. This signal appears by way of a lead 45 at a respective contact station 1, 2, 3 or 4 on plate 50 in Figure 1; each contact being suitably isolated from the other.

A wiper 51 is rotated on plate 50 by a constant speed scanning motor 60 and this is driven into periodic engagement with each one of the contact stations 1, 2, 3 and 4. If there be any signal on a station when wiper 51 engages the station, the signal at the station is transmitted by way of a lead 67 to a conventional amplifier 68, whose output by way of lead 69 is transmitted to a wiper 51' on a plate 50' having contacts 1', 2', 3', and 4' which are connected through conventional neon lights 1'', 2'', 3'' and 4'' and capacitors 1C, 2C, 3C and 4C to ground. Thus, should one of the transmitter rotors be displaced, the signal developed at contact 1, 2, 3 or 4 is applied to a corresponding light 1'', 2'', 3'', 4'' which glows, indicating that the condition of this instrument has changed from the condition at which the magnetic clutch 42 of the instrument was engaged. Capacitors 1C, 2C, 3C, or 4C sustains the glow for a period of time after the armature 51' moves from its contact station.

In accordance with the present invention, therefore, the pilot is not required to examine each of the various instruments but merely to occasionally note if a bulb 1'', 2'', 3'', or 4'' is lighted to determine if the value of any of his instruments has changed from its value at the time the magnetic clutch was operated.

Figure 3 shows another embodiment of the monitor utilizing a conventional cathode ray tube 79. In this embodiment the wiper 51B is connected through a suitable gating amplifier 80 to the grid 83 of a cathode ray tube 79. The centering coils 85 and 86 of tube 79 are connected to respective windings 87 and 88 of a generator having a permanent magnet rotor 89 which is driven at a suitable rate by a constant speed scanning motor 90, which, through a suitable gear train 91, also rotates wiper 51B.

As wiper 51B scans the various contact stations, and only the null signals are applied by way of gating amplifier 80 to grid 83, a continuous uniform circle appears on the face of the cathode tube, the circle being slightly brighter at positions corresponding to the stations so that an indication is given that the various stations are operative. When a change occurs in one of the monitored conditions, the resultant signal appearing at the station is larger than normal, thus giving a brighter glow at the face of the cathode tube at the position corresponding to this station, thus indicating to the pilot that one of the conditions to be measured has changed from normal.

Figure 4 shows another embodiment utilizing a conventional cathode ray tube 79C. In this embodiment the armature 51C is connected through a suitable gating amplifier 80C to the grid 83C of cathode ray tube 79C. The centering coils 85C and 86C of the tube are connected to the windings 95, 96 of a conventional resolver 97 whose rotor winding 98 is driven at a suitable rate by a constant speed motor which, through a suitable gear train, also rotates wiper 51C. Rotor winding 98 is connected through a conventional discriminator modulator type amplifier 99 to wiper 51C.

As the wiper scans the contact stations and only the null signals are applied by way of gating amplifier A to grid E, a continuous line appears on the face of the cathode tube circling the tube as the wiper 51C scans the stations. The line appears slightly brighter at the positions corresponding to the stations so that an indication is given that the stations are operative. The signals from the station are also applied by way of discriminator modulator 99 to provide an alternating current corresponding to the magnitude of the output of discriminator 91 and a phase corresponding to the polarity of the output as excitation for rotor 98. Thus, upon the appearance of a signal at one of the stations, the line will appear longer or shorter corresponding to the amplitude of the signal at the station and will appear inside or outside of a datum circle corresponding to the phase of the signal. In this way the line is made to indicate the direction and extent of the deviation of the monitored condition from its value at the time the magnetic clutch 42 was engaged.

The foregoing has presented a novel monitor arrangement for a system that will indicate which of a number of conditions measured has changed in value from a subsequent value at which the instrument has been set. The arrangement utilizes a novel transmitter receiver arrangement wherein the receiver is maintained in synchronism with the transmitter until a predetermined time and thereafter provides a measure of the deviation from the condition at this time.

Although but three embodiments of the invention have been illustrated and described, various changes can be made in the design and arrangement of the parts without departing from the spirit and scope of the invention as the same will now be understood by those skilled in the art.

I claim:

1. A device for developing an electrical effect variable with the value of a variable condition, comprising transmitter means having one transmitter part movable relative to the other transmitter part in response to variation in said value, receiver means having a first receiver part connected to said other transmitter part and a second receiver part adapted to move relative to said first receiver part in response to movement of said one transmitter part, said second receiver part also including means for developing a signal upon relative movement of said receiver and transmitter movable parts, and means operable for fixing the position of said second receiver part whereby said second receiver part develops no signal as long as said second receiver part moves in response to movement of said one transmitter part but does develop a signal when said one transmitter part moves after said last-named means is operated.

2. A device for developing an electrical effect variable with the value of a condition, comprising transmitter means for developing an electrical effect corresponding to the value of said condition, a receiver means responsive to said electrical effect and adapted to be synchronized, and including means for developing a signal when synchronization is lost, and means for selectively stopping the synchronization of said receiver means whereby said receiver means develops an output corresponding to the change in value of said condition from the value at the time said last-named means is operated so that said receiver means may be operated selectively as a synchronizer or a signal device.

3. A device for developing an electrical effect variable with the value of a condition, comprising a transmitter having a single phase rotor and a three pole Y-connected stator, means for positioning said rotor relative to said stator in response to the value of said condition, a receiver having a rotor with first and second single phase windings and a three pole Y-connected stator, the first and second single phase windings of said receiver rotor being positioned perpendicularly, means for energizing said first receiver rotor winding whereby said first receiver rotor winding maintains itself in the same position relative to the receiver stator as said transmitter rotor is positioned relative to said transmitter stator and said second receiver rotor winding develops no signal, and means for selectively deenergizing said first receiver rotor winding whereby said receiver and transmitter rotors are no longer maintained in the same relative positions as said value changes and said second receiver rotor winding develops a signal corresponding to the change in value of said condition from the value at the time said last-named means deenergizes said first receiver rotor winding.

4. A device for developing an electrical effect variable with the value of a condition, comprising transmitter and receiver inductive devices, each having rotor and stator windings, said stator windings being connected in parallel, means for energizing the rotor winding of said transmitter, and means for selectively energizing and deenergizing a first rotor winding of said receiver whereby said rotors are synchronized in positional agreement as long as said first receiver rotor winding is energized, said receiver rotor including a second winding for developing a signal corresponding to the error in position of said rotors, whereby when said first receiver rotor winding is deenergized and stops its synchronism with said transmitter rotor, said second winding develops a signal corresponding to the difference in positions of said rotors.

5. Signal means comprising first and second movable parts for developing a signal which changes with the value of a condition, said first part being movable in response to a change in said value, said second part being capable of maintaining itself in positional relation with said first part and also being adapted for developing a signal upon a change in the relative position of said parts, and means operable for selectively rendering said second part incapable of maintaining said positional relationship thereby fixing the datum value of said condition and said second part developing a signal when said parts depart said parts from the position existing at the time said last-named means is operated.

6. In a monitoring system, a plurality of devices including means responsive to the value of a condition, means for fixing the datum value of said condition at an existing value, means operably connected to said first-named means for developing a signal upon a change in value from said datum value, and means for scanning each of said last-named means periodically to indicate any change in any of said devices from said datum value.

7. In a monitoring system, a device including means responsive to the value of a condition, means for fixing the datum value of said condition at an existing value, means operably connected to said first-named means for developing a signal upon a change in value from said datum value, means for scanning said last-named means periodically, and means operably connected to said scanning means for indicating the appearance of said signal.

8. In a monitoring system, a device including means responsive to the value of a condition, means for fixing the datum value of said condition at an existing value, means operably connected to said first-named means for developing a signal upon a change in value from said datum value, and means for scanning said last-named means periodically to indicate any change from said datum value.

9. In a monitoring system, a device comprising means responsive to the value of a condition, means for fixing the datum value of said condition at an existing value, means operably connected to said first-named means for developing a signal upon a change in value from said datum value, means for scanning said last-named means periodically, and means including a light operably connected to said scanning means for indicating the appearance of said signal by a glowing of the light.

10. In a system for monitoring the variation in value of a variable condition, a device including transmitter means having one transmitter part movable relative to the other transmitter part in response to variation in said value, receiver means having a first receiver part connected to said other transmitter part and a second receiver part adapted to be movable relative to said first receiver part in response to movement of said one transmitter part, said second receiver part also including further means for developing a signal upon relative movement of said receiver and transmitter movable parts, and means operable for fixing the position of said second receiver part to establish a datum for said value, whereby said second part does not develop a signal as long as said second receiver part moves in response to said one transmitter part but does develop a signal when said last-named means is operated, and means for scanning said further means periodically to indicate any change from said datum value.

11. In a system for showing the change in value of a condition, a device including a transmitter means for developing an electrical effect corresponding to the value of said condition, a receiver means responsive to said electrical effect and adapted to by synchronized therewith so that the receiver means develops no output, and means for selectively stopping the synchronism of said receiver so that said receiver means develops an output upon a change in value of said condition from the value at the time said last-named means is operated, whereby said receiver means may be operated selectively as a synchronizer or a signal device, and means for scanning said last-named means periodically to indicate any change from said datum value.

12. In a system monitoring the change in value of a condition, a device comprising means responsive to the value of a condition, means for fixing the datum value of said condition at an existing value, means operably connected to said first-named means for developing a signal upon a change in value from said datum value, means for scanning said last-named means periodically, means operably connected to said scanning means for indicating the appearance of said signal, and means including a cathode ray tube connected to said scanning means and responsive to the appearance of a signal for causing said cathode ray to glow.

13. In a monitoring system, a device including transmitter and receiver inductive devices, each having rotor and stator windings, said stator windings being connected in parallel, said transmitter rotor winding being energized, and said receiver rotor winding being selectively energized and deenergized whereby said rotors are synchronized in positional agreement as long as said receiver rotor winding is energized and not synchronized when said receiver rotor winding is deenergized, said receiver rotor including a further winding for developing a signal corresponding to the error in position of said rotors, whereby after said first-mentioned receiver rotor winding is deenergized and stops its synchronism with said transmitter rotor, said further winding develops a signal corresponding to the difference in positions of said rotors.

References Cited in the file of this patent

UNITED STATES PATENTS

| 2,041,500 | Thomas | May 19, 1936 |
| 2,402,108 | Willard | June 11, 1946 |
| 2,405,568 | Perrill | Aug. 13, 1946 |
| 2,696,604 | Markow et al. | Dec. 7, 1954 |

FOREIGN PATENTS

| 767,965 | Germany | May 5, 1955 |